(12) United States Patent
Song

(10) Patent No.: US 7,031,873 B2
(45) Date of Patent: Apr. 18, 2006

(54) VIRTUAL RPM SENSOR

(75) Inventor: Limin Song, West Windsor, NJ (US)

(73) Assignee: ExxonMobil Research and Engineering Company, Annandale, NJ (US)

( * ) Notice: Subject to any disclaimer, the term of this patent is extended or adjusted under 35 U.S.C. 154(b) by 0 days.

(21) Appl. No.: 10/439,959

(22) Filed: May 16, 2003

(65) Prior Publication Data

US 2003/0229469 A1    Dec. 11, 2003

Related U.S. Application Data

(60) Provisional application No. 60/387,274, filed on Jun. 7, 2002.

(51) Int. Cl.
*G06F 19/00* (2006.01)
(52) U.S. Cl. .................................... 702/145
(58) Field of Classification Search ............... 702/145, 702/189, 140, 150; 454/53, 51; 369/112, 369/47, 44, 43; 600/301, 300; 318/802, 318/561, 808, 807; 356/477; 700/279, 229; 73/663, 593, 861; 477/111; 385/12; 33/708; 434/51; 363/131; 348/208
See application file for complete search history.

(56) References Cited

U.S. PATENT DOCUMENTS

| 3,815,426 A | 6/1974 | Rohner .................. 73/488 |
| 5,109,700 A | 5/1992 | Hicho ..................... 73/660 |
| 5,115,671 A | 5/1992 | Hicho ..................... 73/488 |
| 5,627,762 A * | 5/1997 | Cameron et al. .......... 700/279 |
| 5,646,340 A | 7/1997 | Gee et al. ................ 73/116 |
| 5,744,723 A | 4/1998 | Piety ..................... 73/660 |
| 5,747,833 A * | 5/1998 | Fujisaki et al. ............ 318/808 |
| 5,831,178 A * | 11/1998 | Yoshimura et al. .... 73/861.357 |
| 6,087,796 A | 7/2000 | Canada et al. ............ 318/565 |

FOREIGN PATENT DOCUMENTS

| EP | 0775894 | 5/1997 |
| JP | 363140963 | 6/1988 |
| JP | 403007081 | 1/1991 |
| JP | 404208199 | 7/1992 |

* cited by examiner

*Primary Examiner*—John Barlow
*Assistant Examiner*—Tung Lau
(74) *Attorney, Agent, or Firm*—Glenn T. Barrett

(57) ABSTRACT

The present invention is in a "virtual RPM sensor" which is preferably implemented by means of a software process. The software determines the RPM of a rotating machine using an adaptive signal processing algorithm. Preferably, the input to the software system of the present invention is digitized waveform data from either a vibration transducer on a rotating machine or vibration data stored in a database or file. The present invention permits the determination of the RPM of a rotating machine without the requirement of additional hardware so that readings may be obtained inexpensively, accurately and without interrupting machine operation.

13 Claims, 7 Drawing Sheets

VIRTUAL RPM SENSOR

CROSS REFERENCE TO RELATED APPLICATIONS

This application claims priority from Application Ser. No. 60/387,274, filed 7 Jun. 2002.

FIELD OF THE INVENTION

The present invention relates generally to the analysis of rotating machines and more particularly to techniques for measuring the rotation speed of such machines.

BACKGROUND OF THE INVENTION

As manufacturing and processing requirements become more and more complex, today's plants and other manufacturing and processing facilities contain more and more machines and other complex mechanical components and devices of all sizes and shapes and for an exceedingly large variety of applications. For example, in a typical petroleum refinery or other chemical plant, hundreds or even thousands of machines may exist in connection with the various processes being performed at the particular facility.

These machines may include compressors, turbines, pumps, motors, fans and other devices that employ some manner of rotation in connection with their operation. In order to maintain, troubleshoot and otherwise operate these machines over time, it is often important to obtain relatively frequent RPM (rotations per minute) readings with respect to the rotational elements of the machines. These RPM readings can be used to diagnose many problems with the machines that are not readily apparent to the naked eye or are otherwise difficult or impossible to ascertain without the aid of the RPM readings. For example, significant deviations in RPM speed from that which is called for in the machine specification may indicate the existence of an operational problem. Also, significant deviation from the past characteristic operating RPM speed for a particular machine may signal that some form of maintenance or repair is required. As yet another example, known operational problems may be suspected based upon vibration information as the vibration frequency spectrum of the machine relates to the rotational speed of the machine. The presence of excessive vibration levels at certain frequencies, known as defect or fault frequencies, usually indicates a specific machine fault or operational problem. For example, a high vibration at a frequency of 1×RPM may be caused by an unbalance of the machine shaft. The defect frequencies are directly related to the machine speed as multiples of RPM.

In order to properly make such diagnoses, it is quite important for the RPM readings to be accurate, because improper or inaccurate RPM readings can lead to the false belief that a problem exists when one actually does not or, alternatively, the false belief that a problem does not exist when, in fact, one actually does. Additionally, inaccurate RPM readings can lead to misdiagnosis of a machine problem. High accuracy of RPM readings is particularly important when high frequency vibration components are used to detect problems associated with rotating elements of bearings because a small error in RPM readings will be amplified at high frequencies.

There are various prior art methods for obtaining RPM readings for rotating machines. One common technique is to directly measure rotational speed by installing an RPM sensor, commonly known as a "Key Phaser" or a "Tachometer", on the machines. Unfortunately, these RPM sensors are quite difficult to install on existing machines. Further, the sensors are quite expensive and given the large numbers of machines in typical plants, which can number in the thousands, the costs can be prohibitive. It is for this reason that direct speed sensor measurement is often limited to a few critical machines such as major process compressors in a refinery application.

Another method for obtaining RPM readings which is currently in use is through a high-resolution Fast Fourier Transform (FFT) analysis of the vibration signals in order to arrive at an estimate for the RPM value. This method, however, typically requires an operator to interpret the FFT spectrum and is not, therefore, suitable for automatic on-line vibration analysis. Notwithstanding this, as low-cost data acquisition systems are being made commercially available on a broader basis, plants have begun to implement on-line vibration monitoring systems on machines which are not mission critical such as, for example, pumps and motors. These vibration monitoring systems are usually equipped with only vibration sensors and not with speed sensors because of cost constraints. Further, the majority of low-cost on-line vibration monitoring systems are not capable of providing high-resolution FFT vibration analysis. Without direct RPM sensors, the vibration monitoring systems currently in use are relatively inaccurate in terms of providing RPM readings.

There have been attempts to provide more accurate RPM readings based upon vibration analysis techniques. However, many of these techniques still suffer from drawbacks including inaccuracy in RPM readings. In particular, these techniques often result in inaccurate readings especially when the noise associated with the vibration readings is high—a common situation in most plant applications. For example, M. D. Hicho discloses a method for determining the RPM of a rotating machine from a vibration frequency spectrum (see U.S. Pat. Nos. 5,109,700 and 5,115,671, Method and Apparatus For Analyzing Rotating Machines). Hicho's method identifies a set of vibration peaks out of a measured vibration frequency spectrum that corresponds to the frequencies of 1×, 2× and/or 3× of the target RPM of the machine to be measured, and uses those frequencies to estimate the RPM.

This method is simple and straightforward. However, the accuracy of the method is limited to the frequency resolution, amplitude accuracy and background noise in the vibration frequency spectrum. The FFT technique employed to obtain the vibration frequency spectrum is inherently inaccurate due to the spectrum smearing or energy leakage in determining the true peak values of the vibration. Many low-cost data acquisition systems can only provide relatively low resolution of the FFT spectrum. In addition, the FFT technique of Hicho's method neglects the essential phase information of the vibration components and is not effective in suppressing the random noise when compared with averaging techniques in time domain such as "synchronous averaging". Another difficulty with this method is that the selection of a criterion to identify the peaks from the vibration frequency spectrum is arbitrary.

Another method of estimating the RPM of a rotating machine from vibration data is disclosed by K. R. Piety (U.S. Pat. No. 574,472, Method For Determining Rotational Speed From Machine Vibration Data). This method compares the measured vibration frequency spectrum of an unknown machine RPM with a reference spectrum of a known RPM from the same machine, derives a spectrum stretch factor that provides optimal correlation between the two spectra, and determines the RPM of the machine from the stretch factor and the known RPM of the reference spectrum. This method has the same limitations as Hitcho's method because it also operates on the FFT spectrum.

SUMMARY OF THE INVENTION

The present invention comprises a method that employs adaptive signal processing techniques to determine the RPM of a rotating machine from the time-based vibration data. The method is preferably implemented as a "virtual RPM sensor" using a software process. According to a preferred embodiment of the present invention, the input to the "virtual RPM sensor" is a digitized time-based sample sequence of vibration data acquired directly from a vibration transducer mounted on the machine for on-line real-time measurement of the machine RPM. Alternatively, the input to the "virtual RPM sensor" could come from a database or file where the sample sequences of the vibration signal are stored for off-line measurement of the machine RPM. The output of the present invention is the RPM value for the machine in question.

According to the teachings of the present invention, the method and system herein disclosed do not require expensive additional hardware to perform RPM sensing and they do not require machine shut down to initiate a measurement. Additionally, the process may be implemented quickly, efficiently and inexpensively on both new and existing machines and it can be applied to many machines at the same time using a single implementation.

In contrast to prior art techniques for estimating RPM value, the present invention processes the vibration signal in the time-domain, which utilizes not only amplitudes of the different vibration components but also phase relationships between and among the components. This signal processing technique significantly reduces the effect of the background noise and greatly improves the accuracy of the RPM estimation. In addition, it eliminates the need to select a criterion of identifying peaks.

In one embodiment of the present invention, the "virtual RPM sensor" disclosed herein is a software implementation of an adaptive signal-processing algorithm. Further, the sensor preferably consists of three primary components. The first component is a digital band-pass filter which filters out the very high and very low components of the original vibration signal. The second component is a coarse RPM estimator comprising an adaptive digital comb filter which is used as a starting point for the fine estimate of the RPM. Finally, the third component is a fine RPM estimator which uses a mathematical vibration model to fine tune the RPM estimate as determined by the coarse estimator component.

As will be recognized by one of skill in the art, and as will be explained in further detail below, the present invention provides many advantages including cost savings, ease of implementation and significant accuracy improvement in making RPM determinations based upon vibration data. The method and system of the present invention may be implemented as a stand-alone virtual RPM sensor for the purpose of measuring machine speed when coupled with a conventional vibration transducer such as an accelerometer, or as an integrated component contained within an automated on-line vibration analysis and fault diagnosis system.

As disclosed herein, one primary advantage of the present invention is that it offers an ability to accurately calculate rotating machine running speed based solely upon a vibration signal produced by the machine.

Other significant advantages of the present invention include the facts that no speed transducer is needed to determine running speed, no additional hardware is required and the process and system may be implemented quickly and inexpensively on existing machines as well as new machines as they are added to the process.

These and other advantages and objects of the present invention will be apparent to those skilled in the art in connection with the following discussion and the attached figures.

DETAILED DESCRIPTION OF THE PREFERRED EMBODIMENTS

Figure 1:
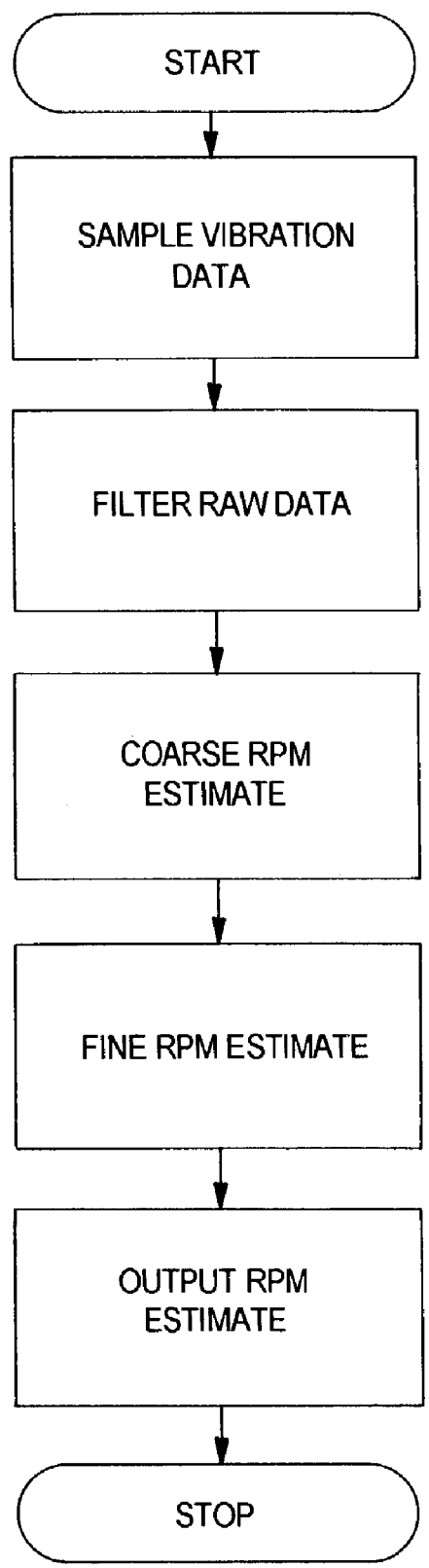
FIG. 1 is a flowchart illustrating the sequence of the five major steps comprising the overall process of the present invention for estimating the RPM of a rotating machine according to a preferred embodiment of the present invention.
Figure 2:
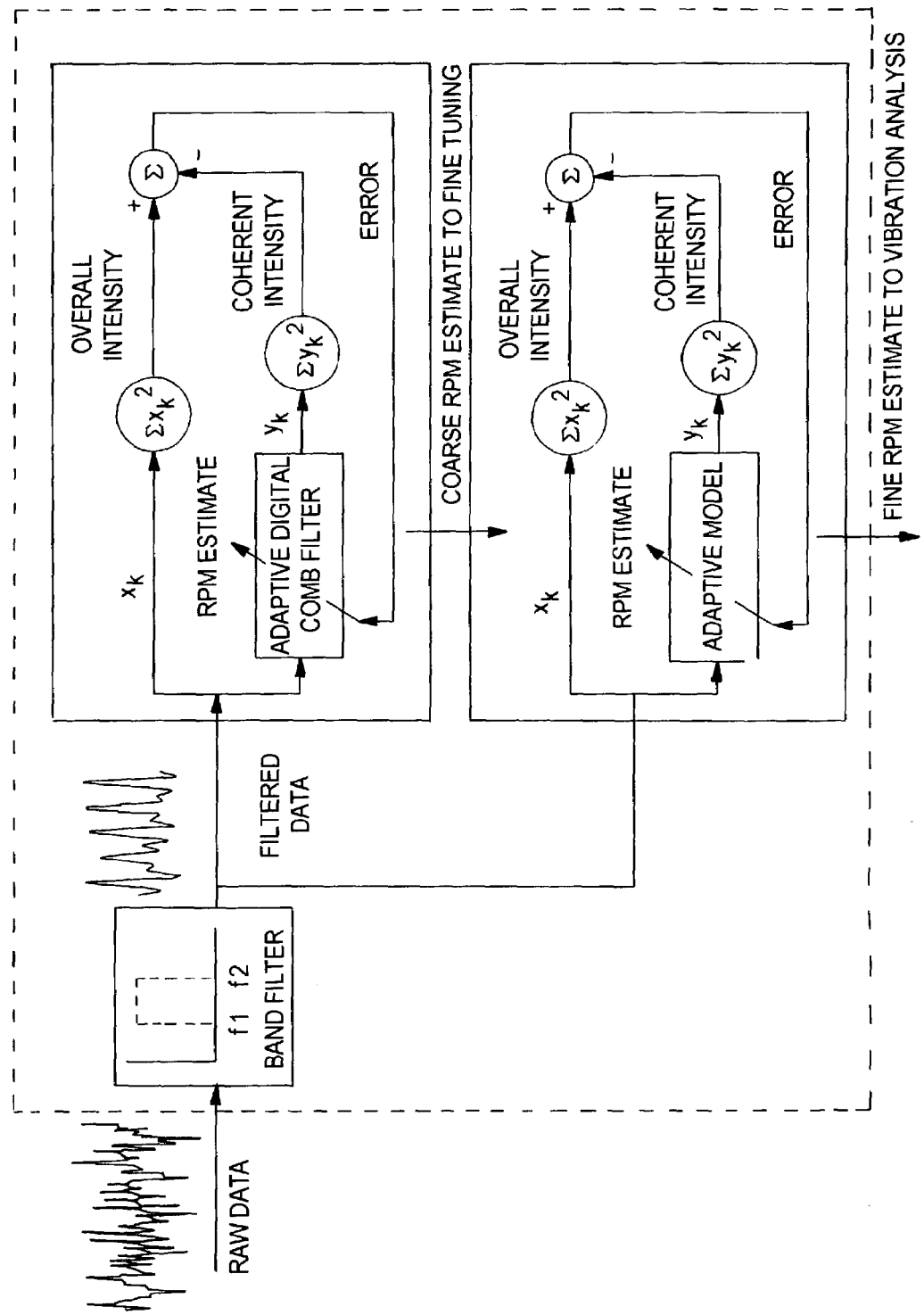
FIG. 2 is a component diagram illustrating the system components of the virtual RPM sensor of the present invention according to a preferred embodiment thereof.

In describing the system and methodology of the present invention, a general description of the process is first provided in connection with FIGS. 1 and 2. Following that, a more detailed description of each step in the overall process is provided in connection with other figures. As the description progresses, it will be apparent to one of skill in the art that the operation of the virtual RPM sensor of the present invention is based upon two underlying assumptions. The first is that the vibration of the relevant machine is steady over the period during which the vibration waveform measurement is taken. The second assumption is that the vibration at the harmonic frequencies of the machine RPM (e.g. 1×RPM, 2×RPM, etc.) are coherent. It is under conditions that these assumptions are met that the methodology of the present invention will provide the most accurate RPM readings. As is known in the art, the operational characteristics of most rotating machines in use in commercial processes today are likely to conform to the underlying assumptions described above.

Turning now to FIGS. 1 and 2, it can be seen that during the first step in the overall process of the present invention the system samples vibration data originating from the subject machine. This sampled signal is referred to herein as the RAW SIGNAL. The system of the present invention may preferably be configured to use constant sampling intervals for the vibration data as will be discussed in greater detail below. In the second step of the process of the present invention the RAW SIGNAL is passed through a digital band-pass filter which removes low and high frequency components of the RAW SIGNAL. By performing this filtering step, the signal-to-noise ratio of the low order periodic components may be enhanced. It is preferable to perform this filtering step in connection with the overall process of the present invention in order to avoid contamination of the RPM estimate as a result of high and low frequency noise. According to a preferred embodiment of the present invention, the filtering process is controlled so as to ensure the inclusion of the lowest order vibration components in the filtered signal (FILTERED SIGNAL). Further, it is preferable that the filter be designed such that the resulting FILTERED SIGNAL includes only the frequencies of the first two or three RPM orders (e.g. 1×RPM, 2×RPM and possibly 3×RPM).

Following the filtering step, the third major step in the process is the coarse RPM estimate step which processes the FILTERED SIGNAL to generate a coarse RPM estimate (COARSE RPM ESTIMATE) for the relevant machine. In a preferred embodiment of the present invention, the FILTERED SIGNAL is passed through an adaptive digital comb filter to produce the COARSE RPM ESTIMATE. Preferably, the digital comb filter employs a Least Mean Square (LMS) algorithm as discussed below to provide a COARSE RPM ESTIMATE that minimizes the error between the overall vibration power and the coherent vibration power. As will be discussed in greater detail below, the COARSE RPM ESTIMATE generated by this step is coarse because the system searches a set of discrete possible RPM values that depends upon the sampling interval of the RAW SIGNAL as defined by the system configuration.

The fourth major step in process of the present invention involves generating a fine RPM estimate. The adaptive algorithm used in this step is similar to the digital comb filtering algorithm employed in the previous step although during this step a continuous vibration model of periodic vibration is used to generate the coherent vibration power. The details of this step of the overall process are described in greater detail below.

Finally, during the final and fifth step of the process of the present invention, the estimated RPM value for the machine which is generated upon completion of the fine RPM estimate is output. The output step may consist of simply displaying or printing the value for a user or the output may be passed to other hardware and software components for further processing and/or analysis. For example, the RPM measurement obtained as a result of the processing as described herein may be passed to vibration analysis and fault diagnosis software and/or hardware. By providing an accurate RPM reading according to the teachings of the present invention, the results of the aforementioned fault diagnosis operations may be greatly improved even without the need for additional hardware such as direct speed sensor components.

It will be understood by one of ordinary skill in the art that although the above processes and algorithms are preferably carried out through a software implementation (i.e. software that performs signal processing upon the RAW SIGNAL and the other signals generated though the process flow), some or all of the steps or system components may be performed by or replaced by, respectively, hardware components (such as a micro-controller or the like) which perform the equivalent or similar functionality without departing from the scope or spirit of the present invention.

Now that a general overview of the process and system of the present invention has been provided, the following discussion provides details with respect to each system component and process step according to the preferred embodiments of the present invention.

Step 1—Sample Vibration Data

In a preferred embodiment of the present invention, vibration data is obtained through the use of a vibration transducer which is placed in physical contact with the machine for which RPM is to be measured. As a result, the vibration transducer senses the vibrations produced by the machine and converts those vibrations into an electrical signal. Preferably, the time-based electrical signal (continuous waveform signal) output from the vibration transducer is digitized by an ADC (Analog-to-Digital Converter) in connection with a PC-based data acquisition system. The digitized sample sequence of the electrical signal is fed into the system of the present invention as the RAW SIGNAL. In the following description, the RAW SIGNAL is represented mathematically as a discrete sample sequence $z(n)$ where $n=0,1,2 \ldots N-1$ and N is the total number of samples in the sequence.

During the digitization process, the sampling interval of the ADC should be kept as constant and the sampling rate or frequency should be at least two times more frequent than the maximum frequency of the vibration signal in order to avoid an aliasing effect. For example, if the maximum frequency of the vibration is 1000 Hz, the sampling rate should be higher than 2000 Hz. Preferably, the sampling rate is 4 to 6 times more frequent than the maximum frequency of the vibration signal. If necessary, an anti-aliasing analog low-pass filter should be used before the digital sampling in order to remove high frequency components.

The time duration of the sampling or length of sample sequence should be sufficiently long in order to obtain an accurate estimate of the RPM. Preferably, the length of the sample sequence should be at least 20 times longer than the period of one complete rotation of the machine. For typical pumps and motors of nominal speed of 3600 RPM, the length of the sample sequence should be ⅓ seconds or longer.

Once the vibration data has been sampled as described above, the process may proceed to the next step wherein the RAW SIGNAL is further processed according to the teachings of the present invention.

Step 2—Digital Filtering

The next step in the process of the present invention calls for passing the RAW SIGNAL through a digital band-pass filter in order to remove very low and very high frequency components from the RAW SIGNAL. The output of the filter will be the FILTERED SIGNAL, a sample sequence of the same length as that of the RAW SIGNAL. This step serves to enhance the signal to noise ratio of the periodic components in the low orders of the machine speed. According to the teachings of the present invention, the filter is designed such that the FILTERED SIGNAL contains only the lowest order vibration components. In a preferred embodiment of the present invention, the filter is designed such that the frequencies which are permitted to pass through the filter include only the frequencies of the first two or three RPM orders (e.g. 1×RPM, 2×RPM and possibly 3×RPM). Alternatively, a low pass filter can be used in the place of the band pass filter if the vibration components below the frequency of 1×RPM are very low. Furthermore, if the low order vibration components dominate the original vibration signal a null filter (no filtering operation) can also be used.

Figure 3:
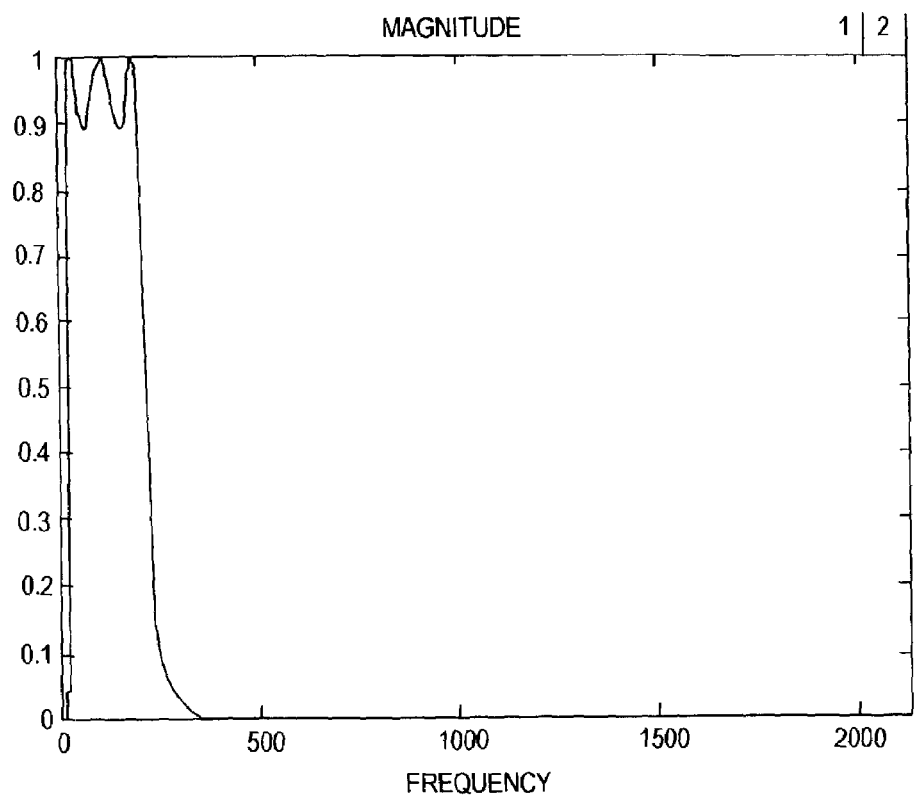
FIG. 3 is a graph illustrating a possible frequency spectrum obtained from a running machine through the use of a vibration transducer according to a preferred embodiment of the present invention.

Turning now to FIG. 3, an example of the frequency response of a digital band-pass filter which may be utilized as a component of the system of the present invention is provided. In a preferred embodiment of the invention, an infinite impulse response (IIR) type filter is used. As will be apparent to one of skill in the art, however, other filter types such as a finite impulse response (FIR) type filter may also be used. According to the teachings of the present invention, because different machines may have different operational RPM ranges, the band-pass filters employed to perform the filtering step may vary by application. Of course, if a group of machines have a similar or reasonably close RPM operational range, a single digital filter may be used in the system of the present invention in connection with measurements taken on each of those machines. If operating ranges of machines vary significantly, provision may be made in the software implementation of the present invention for selection of one of many available filtering algorithms based upon the expected operational speed of the machine or machines to be measured.

Preferably, the digital filter is implemented in the time domain in a software process. The filtering operation is defined by the following equation:

$$a_0 x(n) = \sum_{j=0}^{K} b_j z(n-j) - \sum_{j=1}^{K} a_j x(n-j)$$

where K is the order of the filter, $a_j$ and $b_j$ are the coefficients of the filter, and $z(n)$ and $x(n)$ are the sample sequences of the RAW SIGNAL and FILTERED SIGNAL.

Step 3—Coarse RPM Estimation

Once the RAW SIGNAL has been converted into the FILTERED SIGNAL through the use of the filtering algorithm described above, a coarse RPM estimation is determined based upon the FILTERED SIGNAL through the use of an adaptive digital comb filter which is preferably implemented in software according to the teachings of the present invention. The filtering operation of this step preferably employs a Least-Mean-Square algorithm that provides an RPM estimate that minimizes the error between overall vibration power and coherent vibration power. The estimate is coarse because the estimate is determined by searching a set of discrete possible RPM values that depend upon the sampling interval of the original signal.

The comb filter of the present invention preferably employs the adaptive synchronous time-domain averaging technique. According to this technique, the sample sequence of the FILTERED SIGNAL (referred as a total record herein) is divided into a number of sub-sequences (referred as sub-records herein) with an equal number of samples. Next, the sub-records are summed point by point into a single record and averaged by the number of the sub-records. This summation and averaging is illustrated in FIG. 4A.

Figure 4:
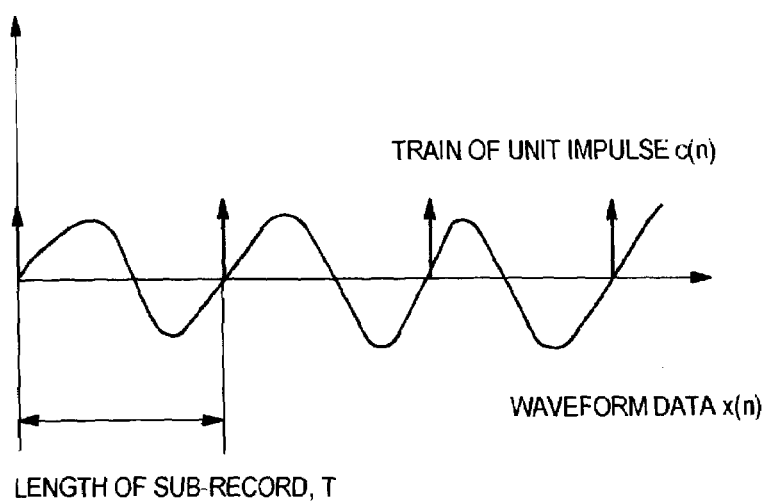
FIG. 4 is a graphical diagram illustrating a unit input train for waveform data in connection with the synchronous time domain averaging technique employed during the coarse RPM estimation step of the present invention.
Figure 4A:
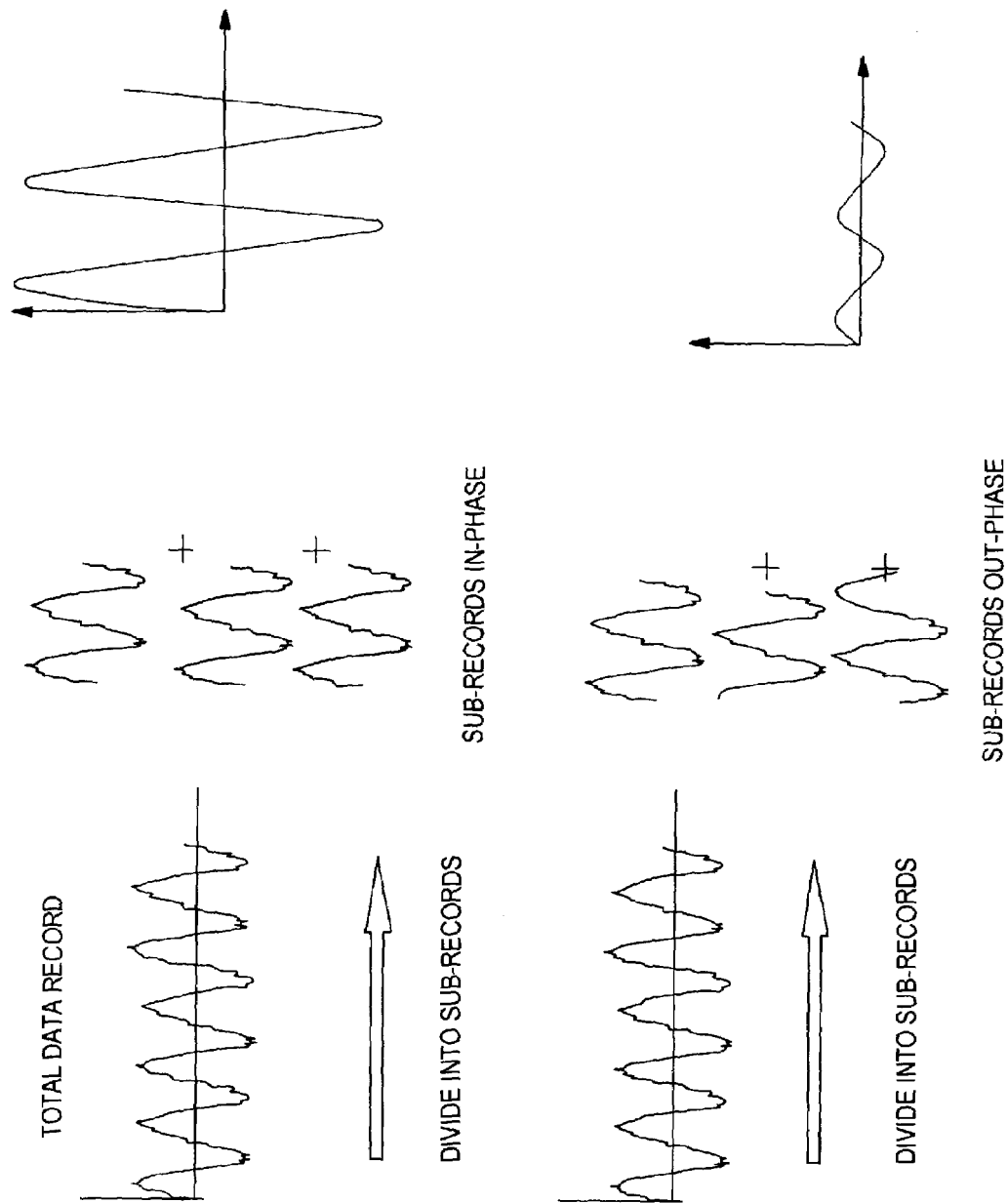
FIG. 4A is a graphical illustration showing the concept of coherent vibration summation and averaging employed during the coarse RPM estimation step of the present invention.

As can be seen in FIG. 4A on the top, if the captured waveform is divided into sub-records which are in phase with one another, these sub-records add up coherently so long as the length of the sub-records is equal to the exact period of the machine rotation. However, as shown in the bottom of FIG. 4A, when the sub-records are out of phase with one another, they tend to cancel each other out when the sub-record length differs from the exact period of the machine rotation.

If the length of the sub-records is exactly equal to the period of 1×RPM vibration, then the sub-records will be in phase with each other in terms of RPM-associated vibration components and the summation of the sub-records will add up coherently. Otherwise, the sub-records will be generally out of phase and the summation of the sub-records will tend to cancel each other. The adaptive synchronous averaging searches this "exact length" through a predefined range of the sub-record length. As a result of the adaptive synchronous averaging, the coherent vibration power is at its maximum if the length of the sub-records is equal to or closest to the "exact length". Mathematically, the synchronous averaging technique can be described by a convolution of the FILTERED SIGNAL data with a train of unit impulse as is shown in FIG. 4. The period of the unit impulse train is set equal to the length of the sub-records.

The sequence of the impulse train illustrated in FIG. 4 can be defined as:

$$c(n, P) = \frac{1}{M} \sum_{i=0}^{M-1} \delta(n - iP)$$

Where the delta function is 1 when n=iP and zero otherwise. P is the length of the sub-record in terms of the number of samples and M is the number of sub-records.

The synchronous average of the FILTERED SIGNAL sample sequence x(n) is then calculated by:

$$\bar{x}(n, P) = \sum_{j=0}^{N-1} c(n, P) x(n - j)$$

where N is the total number of samples in the sample sequence x(n). In the above convolution equation, the impulse train functions as a filter whose shape is similar to a comb in the frequency domain. The c(n) represents the coefficient of the digital comb filter used in connection with the coarse RPM estimation step. It will be noted by one of skill in the art that the average of x(n) is a function of the sub-record length P. The system of the present invention determines P such that it is equal to or the closest possible to the true period of the 1×RPM vibration. Once P is found, the estimate of the RPM is then:

$$RPM_c = 60 \frac{f_s}{P}$$

where $f_s$ is the sampling frequency of the original vibration data.

An adaptive algorithm is used to adjust P such that the error is minimized. The error function is the difference between overall vibration power and coherent vibration power, defined as:

$$J(P) = \frac{1}{N}\left[\sum_{n=0}^{N-1} x^2(n) - \sum_{n=0}^{N-1} \bar{x}^2(n, P)\right]$$

In a preferred embodiment of the invention, the algorithm of the coarse RPM estimation step starts with an initial value of $P_{min}$ and then searches through a range of $P_{min}$ through $P_{max}$ until a P is found that minimizes the error function J. The selection of $P_{min}$ and $P_{max}$ requires prior knowledge of the maximum possible variation in machine RPM for the particular machine for which rotation speed is being measured. In a preferred embodiment, the range of plus and minus 20% of normal machine speed may typically be used for the variation range.

Since P is a multiple of the sampling interval used in the data acquisition phase, the accuracy of the coarse RPM estimation obtained from this step is limited to how fast the waveform data is sampled or the related sampling frequency. However, based upon the technique discussed above and the related calculations, the true machine RPM will fall within the following range:

$$60\frac{f_s}{P+1} < RPM < 60\frac{f_s}{P-1}$$

Step 4—Fine RPM Estimation

Once a coarse RPM estimate has been obtained as discussed above, the next step is to use a mathematical vibration model to fine tune the RPM estimate. The adaptive algorithm used in this step is similar to the digital comb filter used in connection with the coarse RPM estimation step but in this case a continuous vibration model of periodic vibration as a function of machine speed is used to generate the coherent vibration power. The preferred methodology for determining the fine RPM estimate is:

$$\bar{x}(n, RPM) = \sum_{i=1}^{K} A_i \cos\left(i\pi \frac{RPM}{30} \frac{(n-1)}{f_s} + \theta_i\right)$$

where $f_s$ is the sampling frequency, K is the number of harmonics as orders of RPM, $A_i$ and $\theta_i$ are the amplitude and phase angle of the i-th vibration harmonic, and RPM is the target. In a preferred embodiment of the invention, the value of K is chosen such that the maximum frequency of the FILTERED DATA falls within the frequency range of the (K-1) and K orders in the model. The maximum frequency of the FILTERED DATA is usually the upper cut-off frequency of the digital band filter used in the filtering step. The step length for the RPM search is selected for precision requirement. For example, for a precision of +-1.0 RPM, the step length is 1.0 RPM.

An adaptive algorithm similar to the one described above for the coarse RPM estimation is used to search for the fine RPM estimate within the range determined by the coarse estimation step as detailed above. It is preferable that while searching in this range, the search is conducted such that the error function J described above in connection with the coarse estimation step is minimized through iterations. For each iteration, a target RPM is chosen, and the coefficients $A_i$ and $\theta_i$ are calculated with a Discrete Fourier Transform (DFT). Then, the error function J is calculated. The fine estimate for the true RPM is the target RPM that minimizes the error function J. Although the algorithm reflects a nonlinear cost function of RPM, the methodology and the equation above can be linearized with respect to RPM when the search range is relatively small and a fast computation algorithm and significant processing power are available.

Step 5—Output Rpm Estimation

Once the fine RPM estimation has been determined by first obtaining a range in the coarse estimation step and then searching that range for a fine estimation during the fine RPM estimation step, the system of the present invention preferably outputs the fine RPM estimation value for the user to view. As discussed above, the results may also be fed directly into software or hardware for further processing including additional vibration analysis and/or fault diagnosis processing.

APPLICATION EXAMPLE

In order to further illustrate the system and the method of the present invention, an real-world application example is now provided wherein raw vibration data was acquired for two motor-driven pumps in order to test system performance. In this case, the design speeds for both pumps were 3600 RPM. Using a speed resolution of +/-1 RPM, the pump speeds were measured by the system of the present invention to be 3538 RPM for Pump 1 and 3579 RPM for Pump 2.

Figure 5:
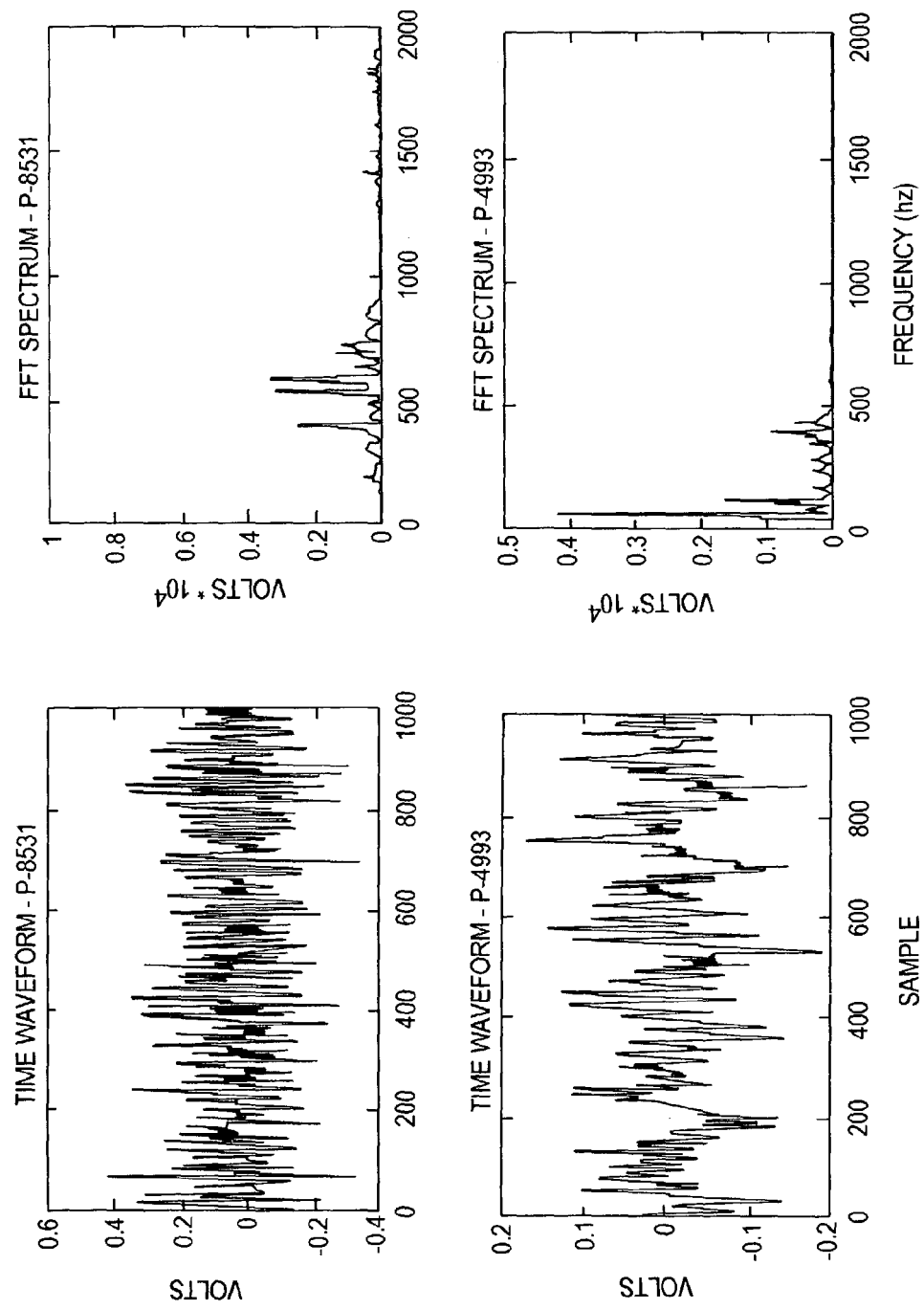
FIG. 5 is a graphical illustration showing vibration waveforms and frequency spectrums for two pumps used in connection with the testing of the system of the present invention.

FIG. 5 illustrates the vibration waveforms and frequency spectrums for both Pump 1 and Pump 2. The pumps have significantly different vibration characteristics in that Pump 1 exhibits a fairly simple spectrum with dominantly low frequency vibration while Pump 2 generates a very complex spectrum with excessive high frequency components and a significant amount of broadband noise. There is also a substantial amount of DC noise in the spectrums due to the integration of the data acquisition system during the testing period.

Figure 6:
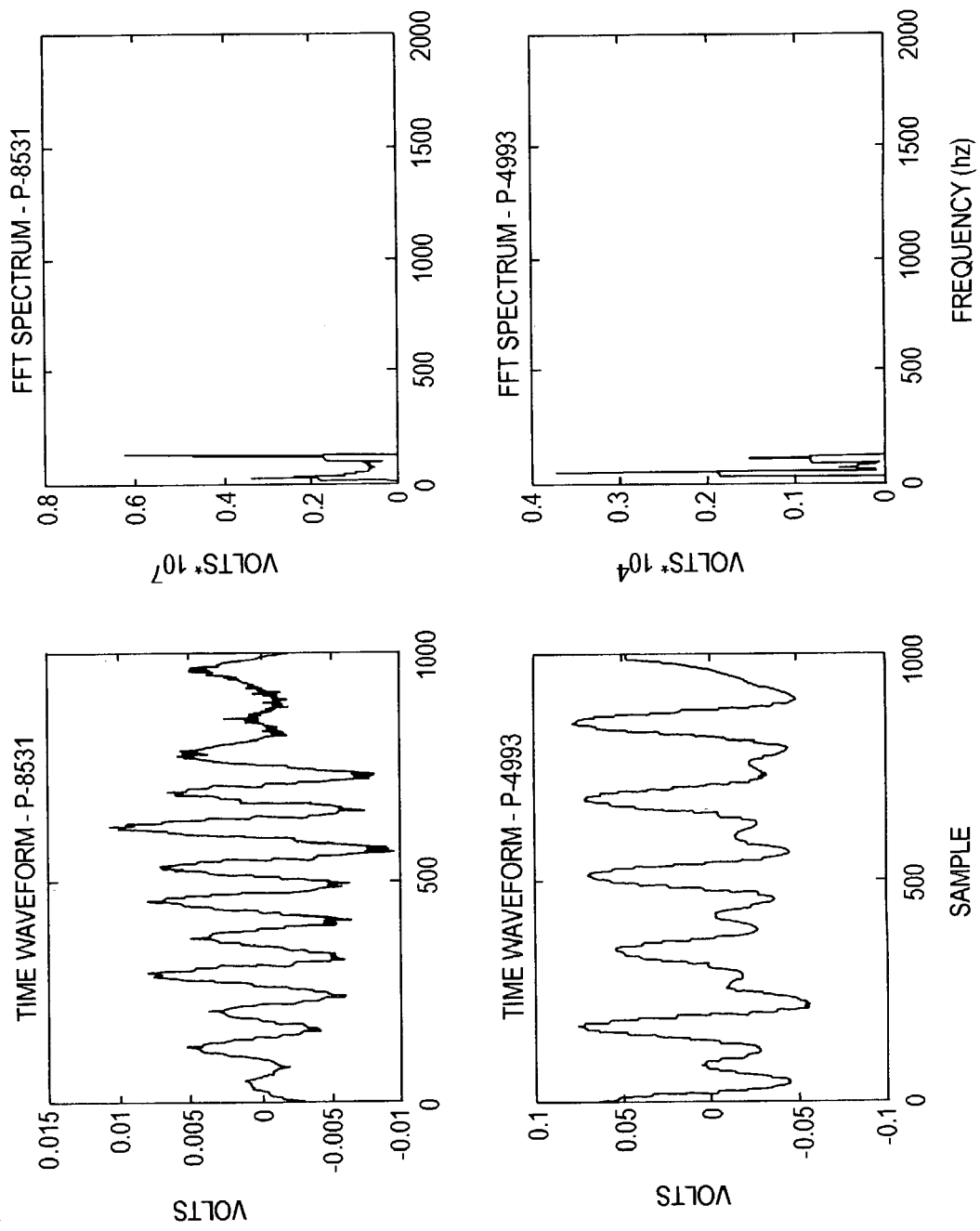
FIG. 6 is a graphical illustration showing filtered vibration waveform and frequency data for two pumps used in connection with the testing of the system of the present invention.

The graphs in FIG. 6 illustrate vibration waveform and frequency data for the two pumps after completion of the filtering step of the present invention wherein a digital band-pass filter is used to filter higher order harmonics and noise from the waveform and frequency data. As compared to the raw vibration data graphs in FIG. 5, it can be seen that the filtered data in FIG. 6 contains only the first two harmonics (1×RPM and 2×RPM) and the periodicity of the vibration data is much more apparent.

Figure 7:
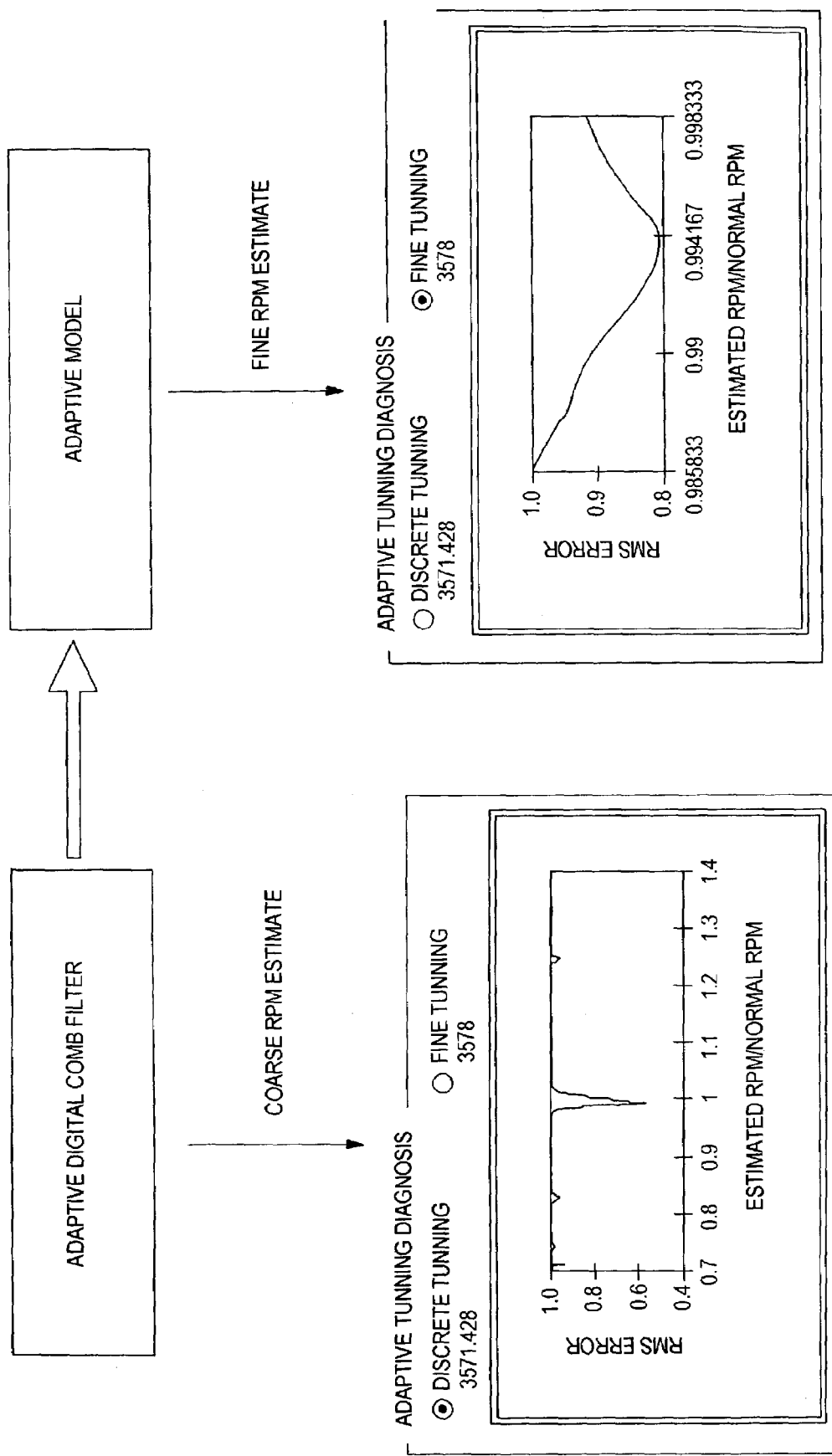
FIG. 7 is a graphical illustration showing coarse and fine RPM estimates generated by the system of the present invention for one of the two pumps used in connection with the testing of the system.

Finally, FIG. 7 illustrates the RPM estimation output resulting from the system of the present invention upon testing Pump 2. As can be seen from the Figure, the coarse RPM estimation generated by the system was 3571.4 RPM and the fine estimation generated was 3578 RPM. These compare to an actual speed of 3579 RPM as measured by a speed sensor. The estimation error in this case is -1 RPM.

During the testing of both pumps, a total of approximately 10 minutes of vibration data was acquired for each pump, with the testing divided into several segments. Each segment of vibration data was used as input to the system of the present invention in order to obtain an instantaneous RPM estimate. The following table lists the fine estimates of RPM values for each of the pumps using the different segments of data.

| VIBRATION WAVEFORM | RPM ESTIMATE | |
| --- | --- | --- |
| DATA | PUMP 1 | PUMP 2 |
| Segment 1 | 3537 | 3579 |
| Segment 2 | 3536 | 3577 |
| Segment 3 | 3541 | 3576 |
| Segment 4 | 3537 | 3579 |
| Segment 5 | 3539 | 3578 |
| Segment 6 | 3538 | 3577 |
| Segment 7 | 3539 | 3579 |
| Segment 8 | 3537 | 3577 |
| Mean of RPM Estimates | 3538.0 | 3577.8 |
| Standard Deviation | 1.6 | 1.2 |
| Measured RPM's | 3538 | 3579 |

Using the RPM estimates of the system of the present invention, the accuracy of spectrum analysis even for an order of 20 (20×RPM) is less than 1 Hz. It would be very difficult to achieve this quality of result even through the use of a high-resolution FFT analyzer.

The foregoing disclosure of the preferred embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims, and by their equivalents.

The invention claimed is:

1. A method for estimating the operating speed of a machine from time-based vibration data samples obtained from a vibration transducer, comprising the steps of:
   (a) acquiring said time-based vibration data samples from said vibration transducer in physical constant with said machine;
   (b) filtering said acquired time-based vibration data samples in order to obtain maximum low order vibration components while eliminating other components;
   (c) estimating machine operating speed using said filtered time-based vibration data samples;
   (d) fine tuning said machine operating speed estimate using a continuous vibration model; and
   (e) providing said fine tuned machine operating speed estimate to a user.

2. The method of claim 1 wherein said fine tuned machine operating speed estimate is provided to an external device for condition monitoring.

3. The method of claim 1 wherein said time-based vibration data samples are obtained at a constant sampling rate.

4. The method of claim 1 wherein said time-based vibration data samples are obtained from a database containing sample data previously obtained from said machine.

5. The method of claim 1 wherein said filtering step is accomplished through the use of a digital filter.

6. A method for estimating the operating speed of a machine from time-based vibration data samples obtained from a vibration transducer, comprising:
   (a) acquiring said time-based vibration data samples from said vibration transducer in physical constant with said machine;
   (b) filtering said time-based vibration data samples in order to obtain maximum low order vibration components while eliminating other components;
   (c) estimating machine operating speed using said filtered time-based vibration data samples, wherein said estimating operating machine speed is accomplished through the use of a digital comb filter;
   (d) fine tuning said machine operating speed estimate using a continuous vibration model; and
   (e) providing said fine tuned machine operating speed estimate to a user.

7. The method of claim 6 wherein said step of estimating machine speed further comprises the steps of:
   (a) selecting a discrete range of operating speeds through which to conduct a search;
   (b) dividing the time-based vibration data sample into a plurality of sub-records of sample length P;
   (c) obtaining the coefficients of a digital comb filter based upon P;
   (d) convoluting the time-based vibration data samples using the digital comb filter in the time-domain;
   (e) computing the total vibration power and the coherent vibration power;
   (f) computing a vibration power error function;
   (g) selecting the optimal P that minimizes the error function by comparing the error functions of all sub-record lengths within said selected discrete range of operating speeds; and
   (h) estimating the machine speed RPM based upon said selected optimal P.

8. The method of claim 7 wherein said total vibration power is determined by summing the squares of all sub-records and the coherent vibration power is determined by summing the squares of all time-averaged samples.

9. The method of claim 8 wherein the error function is determined by subtracting the coherent vibration power from the total vibration power.

10. The method of claim 7 wherein said machine speed is estimated as an RPM and is based upon said optimal P by dividing the sampling frequency by the optimal P value and multiplying the result by 60.

11. A method for estimating the operating speed of a machine from time-based vibration data samples obtained from a vibration transducer, comprising:
   (a) acquiring said time-based vibration data samples from said vibration transducer in physical constant with said machine;
   (b) filtering said time-based vibration data samples in order to obtain maximum low order vibration components while eliminating other components;
   (c) estimating machine operating speed using said filtered time-based vibration data samples;
   (d) fine tuning said machine operating speed estimate using a continuous vibration model; and
   (e) providing said fine tuned machine operating speed estimate to a user,
   wherein said fine tuning said machine operating speed further comprises:
   (a) selecting a machine speed step length for searching RPM;
   (b) selecting a search range of machine speed based oh the result of an optimal P obtained through the said estimating step;
   (c) using a continuous vibration model of K's vibration harmonics to represent the coherent vibration, in which each harmonic is a vibration component with a frequency as a multiple of RPM, and the number of harmonics are selected to include all possible vibration components in the filtered vibration samples to be processed;

(d) using a DFT to obtain the coefficients of said continuous vibration model from the filtered dine-based vibration data samples;

(e) computing the coherent vibration power from said continuous vibration model;

(f) computing the error function; and (g) obtaining a machine operating speed measurement that minimizes the cost function.

12. The method of claim 11 wherein the cost function is the difference between overall vibration power and coherent vibration power.

13. The method of claim 11 wherein the cost function is determined by subtracting the coherent vibration power from the total vibration power.

* * * * *